Dec. 3, 1963   L. M. GREENE   3,112,905
AIRPLANE INSTRUMENTS
Filed May 24, 1961   3 Sheets-Sheet 1
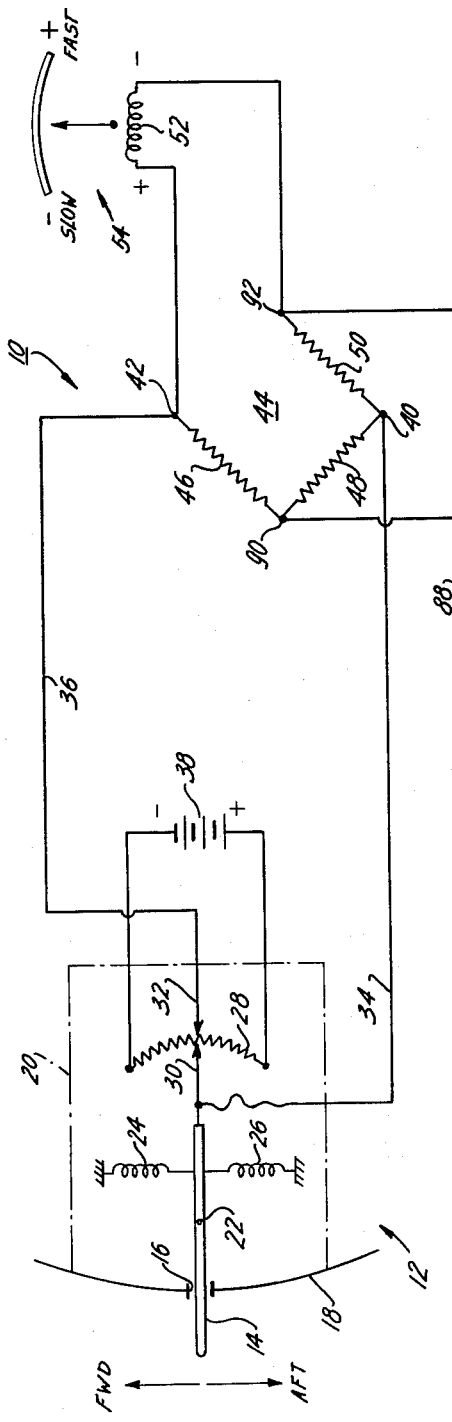
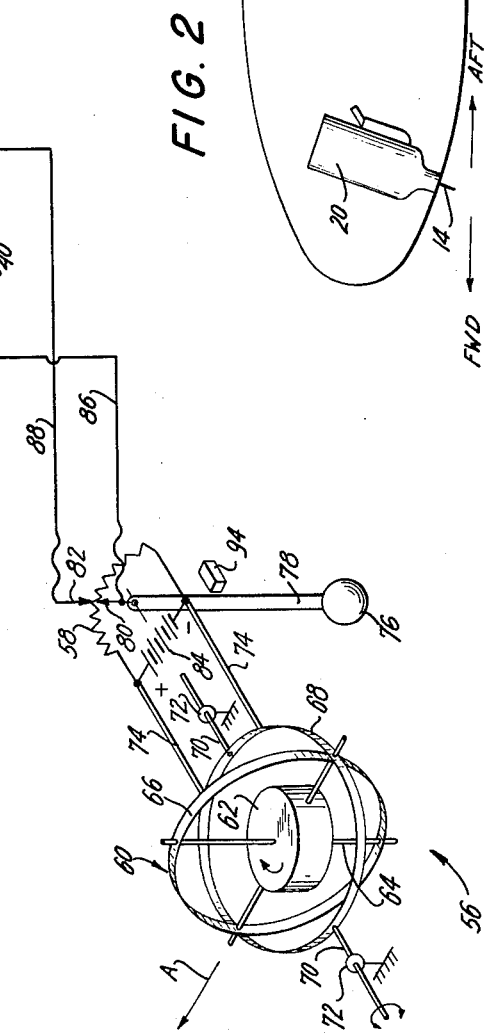
INVENTOR.
LEONARD M. GREENE
BY
*Kirschstein, Kirschstein & Ottinger*
ATTORNEYS Dec. 3, 1963  L. M. GREENE  3,112,905
AIRPLANE INSTRUMENTS
Filed May 24, 1961  3 Sheets-Sheet 2

INVENTOR.
LEONARD M. GREENE
BY
ATTORNEYS

Dec. 3, 1963     L. M. GREENE     3,112,905
AIRPLANE INSTRUMENTS
Filed May 24, 1961     3 Sheets-Sheet 3
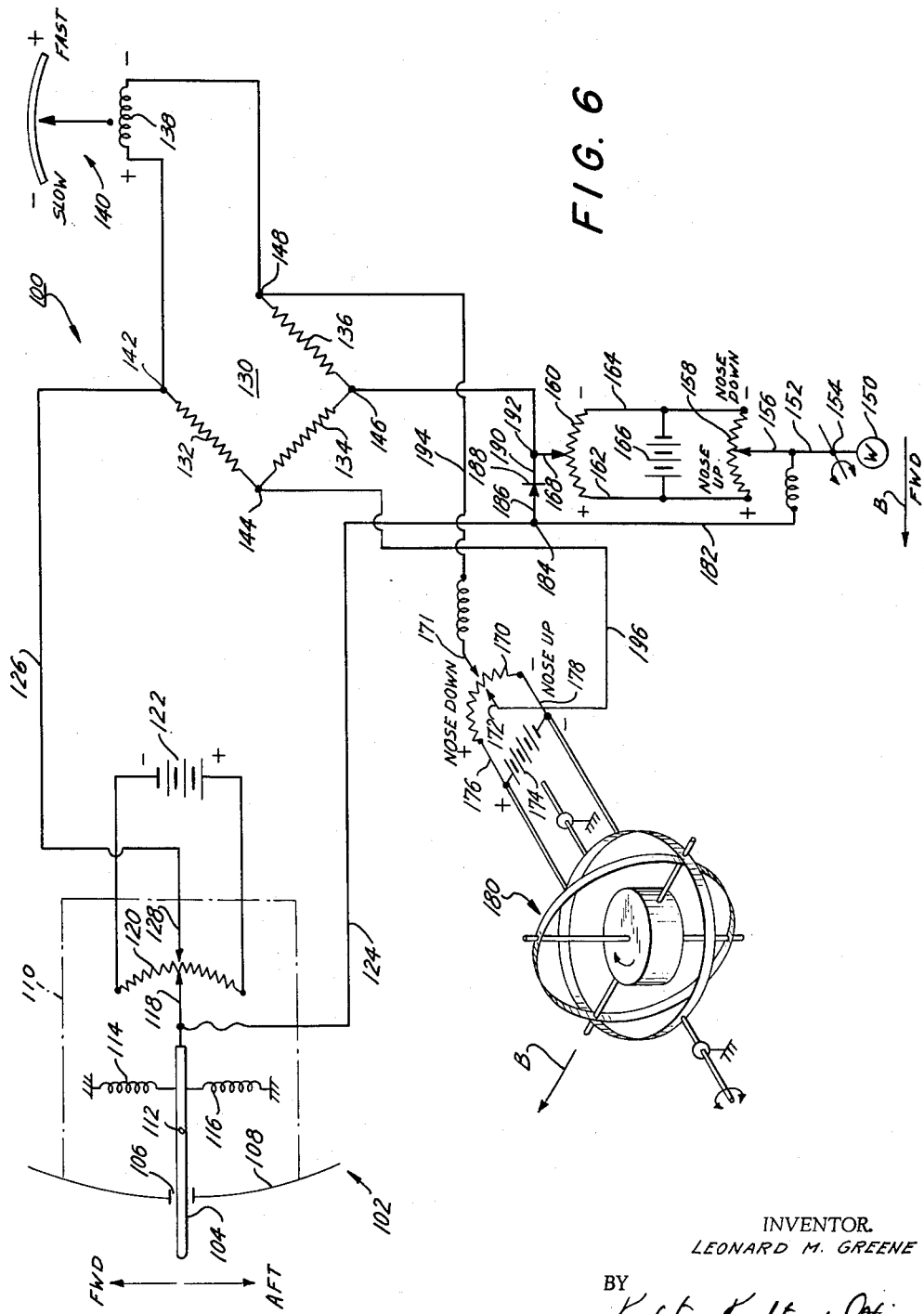
INVENTOR.
LEONARD M. GREENE
BY
ATTORNEYS United States Patent Office 3,112,905
Patented Dec. 3, 1963

3,112,905
AIRPLANE INSTRUMENTS
Leonard M. Greene, Chappaqua, N.Y., assignor to Safe Flight Instrument Corporation, White Plains, N.Y., a corporation of New York
Filed May 24, 1961, Ser. No. 112,415
14 Claims. (Cl. 244—77)

This invention relates to airplane instruments. More particularly, the present invention is an improvement over the airplane instruments shown and described in my copending application Serial No. 768,349 filed October 20, 1958, Serial No. 846,466 filed October 14, 1959, and Serial No. 853,516 filed November 17, 1959.

Essentially, said copending applications disclose instruments in which a director signal is provided for control of an airplane, the same being utilizable either to supply a signal to an automatic control, e.g., an automatic pilot, or to supply a signal to a human pilot who is guided thereby in his manipulation of the manual controls of the airplane. The director signal furnished by said instruments is a combination signal, that is to say a signal which includes the sum of plural inputs. One of the inputs is a function of lift and the other is a function of forward acceleration, i.e., of acceleration in the direction of flight. The effect of summing these two input signals is to provide an output signal that is a function of the lift that will prevail in the immediate future, this being the lift that will prevail when the acceleration has been converted into a change of airplane conditions. In other words, acceleration is a transistory factor which will change the airplane conditions that exist at a given moment, i.e. will increase the speed of the airplane which in turn can bring about an increase in available lift.

If some certain value of such a director signal thus provided is selected which corresponds to some certain value of lift ratio and if the airplane is manipulated so as to maintain said director signal at such selected setting, a constant equilibrium will be maintained for this value of lift ratio. For example, if a certain selected value of this signal is established for take-off at a minimum required safe air speed and the airplane then is accelerated, the acceleration input component of the director signal will bias said signal in a direction of additional available lift, indicating that the speed of the airplane soon will exceed the required minimum speed and that the additional (accelerating) force should be converted into a higher lift ratio. Therefore the autopilot or human pilot will interpret this increased lift signal as an indication of excessive speed and will manipulate the airplane so as to anticipate and prevent the increase in speed by converting the extra force into a steeper angle of climb. In take-off, an airplane traditionally is operated at maximum power, so that the pilot (automatic or human) will by keeping the director signal at the selected setting cause the airplane to climb at the steepest angle that can be reached with the available power at the minimum safe air speed.

Too steep an angle of climb at maximum power and minimum safe speed may be objectionable for various reasons. It can be avoided by selecting a different setting for the director signal which causes the airplane to reach lift equilibrium at a higher flight speed than the minimum safe speed and thereby reduces the angle of climb. However, if an engine should fail, it would be desirable to again shift the selected setting for the director signal to a value corresponding to a lower flight speed which would be the minimum safe air speed for flight with an engine out. This changeover readily can be accomplished with the aforesaid airplane instruments by using a switch to change the value of the selected setting of the director signal. However, it is desirable that this be effected automatically and, moreover, that such change in selected value of director signal be a gradual one rather than a discontinuous one.

It is, accordingly, an object of the present invention to provide an improved airplane instrument which furnishes a director signal that is a combined function of lift and forward acceleration and which further will automatically tend to prevent an excessive climb angle when the available power exceeds a predetermined amount.

It is another object of my invention to provide an airplane instrument of the character described, i.e., one having a director signal that is a combination of lift and forward acceleration, which will automatically tend to prevent an excessive climb angle when full power is available and yet which will provide a correct signal for proper manipulation of the airplane at a safe speed when less than full power is available.

It is another object of my invention to provide an aircraft instrument of the character described which for normally powered operation of an airplane will not cause too steep a climb for passenger comfort, but which for subnormally powered operation will maintain the airplane in proper attitude for the safe flight if sufficient power is available.

Other objects of my invention in part will be obvious and in part will be pointed out hereinafter.

My invention accordingly consists in the features of construction, combinations of elements and arrangements of parts which will be exemplified in the airplane instruments hereinafter described and of which the scope of application will be indicated in the appended claims.

In the accompanying drawings in which are shown various possible embodiments of my invention, FIG. 1 is a composite circuit and schematic view of an airplane instrument embodying my invention;

FIG. 2 is a schematic view showing the location of a lift sensing means on an airplane wing;

FIG. 6 is a view similar to FIG. 1 of the circuit of an airplane instrument embodying a modified form of my invention.

Figure 5:
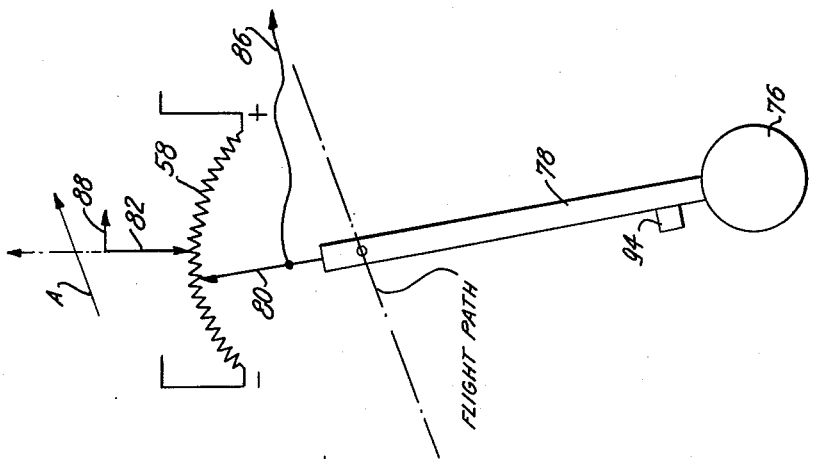
FIG. 5 is a view similar to FIG. 3, but showing the positions of the components with the airplane nosed up at an angle steeper than that indicated in FIG. 4.

Basically, I carry out my invention by providing a suitable lift sensing means and by combining the output signal therefrom with an output signal from a pendulum-controlled horizontally stabilized forward acceleration sensing means. Such an arrangement is disclosed in my said copending applications. However, pursuant to the present invention the acceleration sensing means is so specially constructed that at a predetermined threshold value of pitch attitude of the airplane (inclination of the longitudinal axis of the airplane with respect to the horizontal) the acceleration sensing means no longer is responsive to positive forward acceleration, but becomes exclusively responsive to pitch attitude or to negative forward acceleration.

More specifically, I provide in conjunction with the pendulum-controlled horizontally stabilized sensing means a blocking arrangement or stop the position of which is responsive to the pitch attitude of the airplane, so that at and above a certain angle of pitch inclination of the fuselage of the airplane the stop will engage the pendulum under conditions of zero forward acceleration and will move the pendulum to a position it occupies during a condition of negative forward acceleration, whereby the acceleration-pitch attitude sensing means at and above such angle furnishes a signal which corresponds to a negative forward acceleration signal. The blocking means can either be mechanical or electrical. Such a signal when combined with the lift signal reduces the lift signal so as to indicate to the pilot (human or automatic) that the air speed of the airplane will soon become too slow and should be increased. Inasmuch as during take-off the airplane is being operated at maximum power, such increase in air speed is obtained by lessening the angle of climb, i.e. lowering the nose.

It thus will be seen that the effect of increasing the angle of climb over a certain threshold value biases the director signal in such a direction that the pilot will tend to reduce the angle of climb, the greater the angle of climb the greater being the biasing signal, whereby for a given maximum power and given weight the angle of climb will be effectively limited. However, should the power available suddenly be lessened as by malfunctioning or failure of an engine and negative acceleration therefor occur to the extent that the pendulum no longer is blocked by the stop, the director signal furnished by my instrument will revert to a forward acceleration biased lift signal that is independent of pitch attitude.

Accordingly, so long as full power is available the instrument will minimize the angle of climb at a higher than minimum safe air speed and when full power is not available the instrument will cause the aircraft to be handled in such a manner as to maintain a safe minimum air speed.

Referring now in detail to the drawings, and more particularly to FIGS. 1–5, the reference numeral 10 denotes a circuit for an airplane instrument embodying my invention and illustrating schematically the various elements which form a part of such circuit. Said circuit 10 includes a sensing means 12 which is responsive to lift ratio. Said means constitutes a vane 14 which extends through a slot 16 in a mounting plate 18 that is adapted to be secured over an opening in the skin of the wing adjacent the nose thereof whereby the vane is responsive to flow of air over the wing. The plate extends across and forms the front wall of a housing 20. Located within the housing is a pivot 22 for the vane which pivot is so positioned that the vane is fulcrumed behind its center of pressure. Suitable means, such, for instance, as a pair of opposed tension springs 24, 26, are provided to bias the vane to an equilibrium position between stops.

The particular location of the vane in the nose, the strength of the springs, and the equilibrium point to which the springs bias the vane when the lift sensing means is idle are not critical for proper performance of the instrument.

The physical movement of the lift responsive means is transduced to a variation in an electric quantity. In general, this is performed by having an element which moves with movement of the vane and the movement of which varies the quantity of an electric characteristic, such, for instance, as capacity, inductance, resistance or voltage. As shown herein, I transduce the position of the movable vane into a controlled voltage, i.e., a voltage the value of which varies with the position of the vane. The voltage is arranged to have a polar value, so that it can be determined how much the position of the vane varies from an arbitrarily selected position.

Such conversion of vane position into a variable electric characteristic can be accomplished with the transducers shown and described in my said copending applications; however I have illustrated a simple transduced in connection with the present instrument 10. Said transducer comprises a potentiometer winding 28 with which there is associated a movable tap 30 and an adjustable tap 32.

The potentiometer winding 28 is fixed to the frame of the airplane. The position of the movable tap 30 is controlled by the position of the vane 14. The position of the adjustable tap 32 is set by a technician and is not varied in flight. Indeed, the setting of the adjustable tap is arrived at for a type of airplane and once determined remains fixed. A lead wire 34 runs from the movable tap 30 and a lead wire 36 runs from the adjustable tap 32. The opposite ends of the potentiometer winding 28 are connected to a source of D.C. voltage, as, for instance, a battery 38. It will be seen that when the vane 14 positions the movable tap 30 to coincide with the adjustable tap 32, no voltage will appear on either lead wire 34, 36. When the vane moves aft the lead wire 36 will be positive with respect to the lead wire 34 and when the vane 14 moves forward the lead wire 36 will be negative with respect to the lead wire 34.

When the instrument is installed, the adjustable tap 32 is set to such a position that no voltage differential appears across the lead wires 34, 36 for a condition of flight at which, with no forward acceleration, the airplane will fly at a predetermined minimum safe air speed.

The lead wires 34, 36 are connected to two opposite junctions 40, 42 of a bridge 44 which constitutes an electric summing mechanism. Said mechanism essentially constitutes an impedance bridge having four arms of equal impedance, these constituting resistors 46, 48 and 50 and a coil winding 52 of a reading meter 54. The lead line 34 is connected to the junction 40 between the resistors 48, 50 and the lead line 36 is connected to the junction 42 between the resistor 46 and the coil 52.

The instrument also includes an acceleration-pitch attitude sensing means 56 which includes an element responsive to pitch attitude and also to forward acceleration, as well as a transducer for converting the position of said element into a variable electric characteristic. When the pitch attitude of the airplane is below a certain threshold value said means is responsive to forward acceleration when the pitch attitude exceeds said value, said means is responsive to the pitch attitude. Accordingly, said means will furnish an electric signal that, below a certain pitch attitude, is a function of forward acceleration and above a certain pitch attitude is a function of pitch attitude.

More particularly, the acceleration-pitch attitude sensing means 56 includes a potentiometer winding 58 which is horizontally stabilized by a gyroscope 60. Said gyroscope has a spinning weight 62 turning in a horizontal plane about a vertical weight shaft 64. The ends of the weight shaft are journalled in a vertical first gimbal ring 66 which lies in a vertical plane parallel to the longitudinal axis of the airplane, i.e. in a fore-and-aft plane. The vertical first gimbal ring 66 is journalled in a horizontal second gimbal ring 68 the journal points being located in a fore-and-aft horizontal line lying in the plane of the first gimbal ring 66. The second gimbal ring 68 is journalled by lateral shafts 70 on a structural element of the airplane, as, for example, between a pair of straps 72 that are rigidly secured to the airplane framework. The shafts 70 are coaxial and extend at right angles to the fore-and-aft direction of flight of the airplane as indicated by the arrow A. As is well known, with an arrangement of this character the second gimbal ring 68 will remain horizontal despite changes in pitch attitude. That is to say, the gimbal ring 68 will remain in a plane parallel to the ground so that the potentiometer winding 58 will be horizontally stabilized. Said gyroscope 60 may be provided with erecting mechanisms of the usual type, which are cut out during take-off. The potentiometer winding 58 is connected to the stabilized ring 68 as by struts 74.

A pendulum 76 has its arm 78 journalled to turn about the axis of one of the horizontal transverse shafts 70, said pendulum arm being connected physically to a movable tap 80 on the potentiometer winding 58. The potentiometer winding also is provided with an adjustable tap 82. A source of D.C. voltage such as a battery 84 is connected across the potentiometer winding 58. A lead wire 86 runs from the movable tap 80 and a lead wire 88 runs from the adjustable tap 82.

When the airplane is under a condition of zero forward acceleration, the movable tap 80 will coincide with the adjustable tap 82 so that no voltage differential will appear across the lead wires 86, 88. When the airplane is experiencing a positive forward acceleration the pendulum 76 will swing rearwardly so that the lead wire 86 will be positive with respect to the lead wire 88. Under conditions of negative forward acceleration, the lead wire 86 will be negative with respect to the lead wire 88. The lead wire 86 is connected to a junction 90 in the summing bridge 44 between the resistors 46, 48. The lead wire 88 is connected to a junction 92 in said bridge between the resistor 50 and the coil 52.

As thus far described, the two sensing means 12, 56 will operate in the same manner as the airplane instruments described in my said copending applications. The sensing means 12 will provide an electric signal which is a function of lift ratio. The sensing means 56 will provide an electric signal which is a function of forward acceleration and the two signals will be summed in the bridge 44 so that the signal appearing across the coil 52 will be a combined signal of prevailing lift modified by forward acceleration. It may be observed that the coil 52 is exemplificative of a utilization mechanism. Another type of utilization mechanism that can be used in place of the coil or in parallel or series therewith, is an auto-pilot, e.g. an auto-pilot which is responsive to said signal and controls the elevators of the airplane.

The present invention differs from the aforesaid airplane instruments in that the sensing means 56 is arranged to be responsive to pitch attitude when the pitch attitude exceeds a threshold value at zero forward acceleration and equivalently lesser values at progressively greater positive forward accelerations. I provide such additional response simply by including a stop 94 carried by the frame of the airplane and located in the path of movement of the pendulum or its arm in an aft direction. If it be considered that the stop is spaced from the pendulum or its arm when the airplane is at zero forward acceleration it will be apparent that as the pitch attitude increases (with acceleration unchanged) the stop 94 will approach and finally abut the pendulum or its arm. It will be apparent that when the pendulum or its arm is thus contacted by the stop, the pendulum no longer will be sensitive to positive forward acceleration and, therefore, as the pitch attitude increases the movable contact 80 will be under the control of said pitch attitude and an increase in the pitch attitude will make the lead wire 86 negative with respect to the lead wire 88 so as to impose on the summing bridge 44, a signal equivalent to a negative forward ground plane acceleration signal. This signal, when added to the lift signal emanating from the sensing means 12 will provide a director signal indicating a lower value of available lift. Consequent manipulation of the elevators of the airplane responsive to said such director signal will result in a lowering of the pitch attitude and therefore the attainment of a reduced angle of climb.

Thus the effect of introducing into the instrument a negative forward acceleration signal which increases with increase in pitch attitude over a predetermined threshold pitch attitude at zero acceleration will result in an angle of climb which is lower and an air speed which is greater than the angle of climb and the air speed which would be obtained if pitch attitude were not taken into account. These circumstances are beneficial at take-off under maximum power which otherwise might be at too steep an angle of climb for the comfort of passengers. Nevertheless, if there should be a lessening of power during take-off as by a malfunctioning or failure of an engine and the pitch attitude should be lowered below the predetermined threshold angle, the effect of positive forward acceleration will again become manifest so that the airplane instrument automatically will furnish a director signal which, for the changed circumstances, will, if followed by the pilot, provide a minimum safe air speed at some angle of climb less than that obtainable with maximum power.

Figure 4:
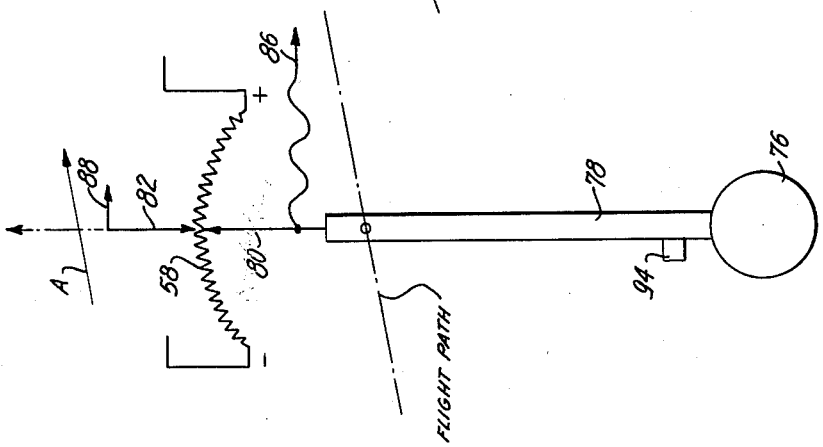
FIG. 4 is a view similar to FIG. 3, but showing the positions of the components with the airplane nosed up at a certain angle at which with no positive forward acceleration the acceleration-pitch attitude sensing means starts to sense only pitch attitude.
Figure 3:
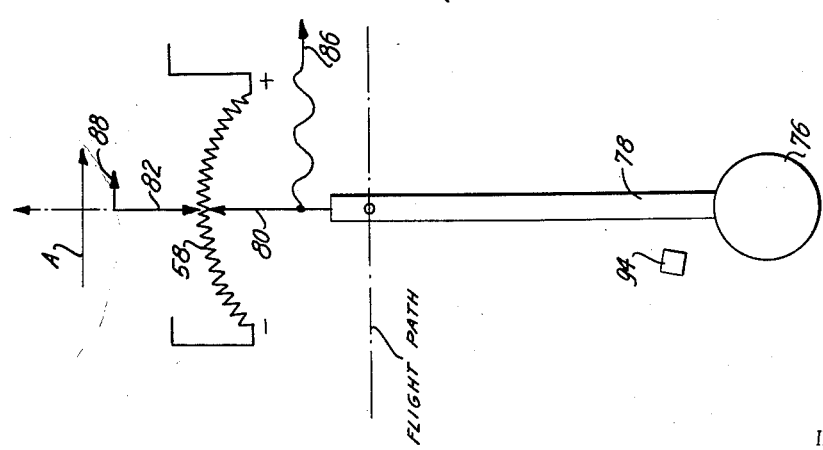
FIG. 3 is a schematic view showing the relative positions of certain components of the acceleration-pitch attitude sensing means with the airplane level and under a condition of zero forward acceleration.

FIGS. 3, 4 and 5 illustrate the foregoing operation of the acceleration-pitch attitude sensing means 56 at zero forward acceleration and different pitch attitudes. In FIG. 3 the condition of said means is shown at zero forward acceleration and level flight (zero pitch attitude). At this time the pendulum 76 hangs straight down and therefore the movable tap 80 is coincident with the adjustable tap 82 so that the sensing means 56 furnishes no signal across the lead wires 86, 88. It will be appreciated that if positive forward acceleration should occur the pendulum would move aft and the movable contact 80 would approach the positive terminal of the battery 84 so as to send a positive forward ground plane acceleration signal to the summing bridge 44. Attention is called to the fact that the stop 94 is several degrees, e.g., 10°, aft of the pendulum and its arm so as to permit the pendulum to shift the movable contact to a position in which the positive signal can be sent.

In FIG. 4 the sensing means 56 is illustrated with the nose of the airplane tipped up at such an angle that with zero forward acceleration the stop 94 just contacts the pendulum or its arm. At this time the movable tap 80 is coincident with the adjustable tap 82. If now the airplane should accelerate, the stop 94 prevents aft movement of the pendulum so that the movable tap will not change its position. Thus when the pitch attitude of the airplane is at this predetermined threshold value of pitch attitude no positive forward acceleration signal can be emitted by the sensing means 56. This, however, does not preclude signalling of negative forward acceleration since the pendulum still is free to move in the fore direction.

FIG. 5 shows the position of the sensing means 56 when the pitch attitude of the airplane exceeds the threshold value of the pitch attitude shown in FIG. 4. At this time the stop 94 has moved the pendulum in the fore direction thereby shifting the movable contact 80 to a position equivalent to a negative forward acceleration so that the sensing means 56 sends a negative acceleration signal to the summing bridge 44.

It will be understood that in the pitch attitude position of FIG. 5, as in the position of FIG. 4, there can be no positive forward acceleration signal and that there will be no negative forward acceleration signal unless the negative forward acceleration is in excess of that which would position the pendulum 76 in the position to which it is shifted by the stop 94.

Accordingly, in the operation of my instrument 10 the acceleration-pitch attitude sensing means 56 will, so long as the pitch attitude is above a certain predetermined threshold value, provide a signal which reduces the signal furnished by the lift sensing means 12 and thereby will so long as the director signal is followed, cause the airplane to be flown at an air speed higher than the minimum safe air speed and at an angle of climb less than the angle of climb that would be obtained were such minimum air speed to prevail; but when the pitch attitude of the airplane falls below such threshold value, as when the engines deliver less than full power, a positive forward acceleration signal again is permitted to appear on the summing bridge whereby to cause the airplane, if the director signal is followed, to fly at the minimum safe air speed and at whatever angle of climb may correspond thereto at such power conditions.

In FIG. 6 the reference numeral 100 denotes a circuit of a modified form of airplane instrument embodying my invention and in which I utilize an electrical blocking means instead of the mechanical blocking stop 94.

The circuit 100 includes a sensing means 102 similar to the sensing means 12, that is to say, it constitutes a vane 104 responsive to lift ratio. The vane extends through a slot 106 in a mounting plate 108 that is adapted to be secured over an opening in the skin of the wing adjacent to the nose thereof, whereby the vane is responsive to movement of the separation point of air flowing over the wing. The plate 108 extends across and forms the front wall of a housing 110 and the vane is pivoted as at 112 within the housing behind the center of pressure of the vane. A pair of opposed tension springs 114, 116 bias the vane to an equilibrium position between stops.

The vane controls the position of a movable tap 118 riding on a potentiometer winding 120. The potentiometer winding is energized by a battery 122 or the like connected across the same. Said winding of the potentiometer is fixed to the frame of the airplane. Accordingly, the position of the tap on the winding will be a function of lift ratio. A lead wire 124 runs from the tap 118. A second lead wire 126 runs from a tap 128 riding on the potentiometer winding 120, the tap 128 being an adjustment tap which is set by a maintenance man or technician. It will be apparent that the voltage appearing across the lead wires 124, 126 is an electric quantity which is a function of lift ratio, the lead wire 126 being positive with respect to the lead wire 124 for higher values of lift (above some preselected value) and negative with respect to the lead wires 124 for lower values of lift (below the selected value). When the instrument 100 is installed the adjustment tap 128 preferably is set to such a position that no voltage differential appears across the lead wires 124, 126 for a condition of flight at which, with no forward acceleration, the airplane will fly at a predetermined minimum safe air speed.

The lead wires 124, 126 are connected in a manner, which will be described later, to an electric summing mechanism constituting a bridge 130. This is an impedance bridge having four arms of equal resistance which constitute resistors 132, 134 and 136 and a coil winding 138 of a reading meter 140. The resistance bridge has four junctions 142, 144, 146, 148, the junction 142 being between the resistor 132 and the coil 138, the junction 144 being between the resistors 132, 134, the junction 146 being between the resistors 134, 136 and the junction 148 being between the resistor 136 and the coil 138.

To sense both acceleration and pitch attitude, I provide a pendulum weight 150 supported on a pendulum arm 152 journalled to turn about a horizontal axis 154 perpendicular to the fore-and-aft direction of flight indicated by the arrow B. The pendulum arm 152 controls the position of a movable tap 156 riding on a potentiometer winding 158 which is shunted by an adjustment potentiometer winding 160 through lead wires 162, 164. The winding 158 is fixed to the frame of the airplane. A battery 166 bridges the lead wires 162, 164. An adjustment tap 168 rides on the potentiometer winding 160. The voltage across the taps 156, 168 will vary as a function both of forward acceleration and of pitch attitude.

To buck the pitch attitude portion of the aforesaid voltage, optionally in such fashion as to oppositely and approximately match the same up to the threshold pitch attitude that a net attitude signal first is to be applied to the summing bridge 130, I provide a potentiometer winding 170 having an adjustment tap 171 and a movable tap 172. The tap 171 is provided for adjustment by a maintenance man or technician and after setting retains its said position with respect to the potentiometer winding. The potentiometer winding 170 is energized by a battery 174 or the like connected thereto through lead wires 176, 178. The movable tap 172 is fixed to the frame of the airplane. The potentiometer winding 170 is horizontally stabilized by a horizontal reference gyroscope 180 the construction of which will not be again described as it is the same as that of the gyroscope 60. Said gyroscope 180 will maintain the position of the potentiometer winding 170 constant with respect to a horizontal reference plane when the pitch attitude of the airplane varies. Accordingly, the position of the movable tap 172 on the potentiometer winding 170 will vary as a function of the pitch attitude of the airplane but not of forward acceleration.

A lead wire 182 runs from the movable tap 156 to a junction 184 with the lead wire 124. A lead wire 186 extends from the junction 184 to a diode 188. This may be a gas filled diode having a low threshold voltage or it may be a solid state diode having a low forward threshold voltage. From the diode 188 a lead wire 190 runs to a junction 192 with the adjustment tap 168 and thence to the junction 146 of the summing bridge 130. Hence, the lead wires 124 and 182 are connected in tandem through the diode 188 to the junction 146. The lead wire 126 runs to the opposite junction 142. Lead wires 194, 196 run from the taps 171, 172, respectively, to the remaining pair of bridge junctions 148, 144.

As in the case of the circuit 10, the polarities of all batteries are as indicated in order to obtain proper functioning of the instrument. For convenience in following the circuit each of the two potentiometer windings 158, 170 the settings of which are responsive to pitch attitude have had the opposite ends thereof marked "nose up" and "nose down" to indicate the positions of their respective relatively movable taps 156, 172 when the airplane experiences a change in pitch attitude.

It should be noted that the resistances of the acceleration-pitch attitude potentiometer winding 158 and of the adjustment potentiometer winding 160 are low in comparison to those of the lift sensing portion of the circuit and the summing portion of the circuit.

The adjustment tap 168 is so set with the aircraft level and unaccelerating that the tap 156 will, at a certain threshold pitch attitude be positive with respect to the tap 168 by an amount sufficient to cause the diode 188 to conduct (the threshold value of the diode). That is to say, at such threshold pitch attitude the forward resistance of the diode becomes comparatively low. The adjustment tap 171 is set so that with the aircraft in level flight the movable tap 172 that is fixed to the air frame will coincide with the adjustment tap 171 whereby at this time no voltage will appear across the lead wires 194, 196.

To explain the operation of the circuit 100, let it be assumed that the airplane is in level non-accelerating flight. No voltage will appear across the lead wires 194, 196. The tap 156 will be at about the same potential as the tap 168 and in any event will be at a potential that is below the threshold potential of the diode 188. The lift signal appearing across the lead wires 124, 126 will, in series with the acceleration signal supplied by the acceleration-pitch attitude potentiometer winding 158, be fed to the summing bridge 130. It will be observed that the diode 188 now is in a relatively non-conducting state, so that it is effectively an open circuit.

If now forward acceleration appears, the acceleration signal will add to the lift signal in a positive sense, so that the left-hand terminal of the coil winding 138 will become more positive. This will cause the needle of the meter 140 to swing to the right which is an indication to the pilot, human or automatic, that the airplane is going too fast and therefore the elevators should be manipulated to increase the climb angle.

Similarly, an increase in the pitch attitude of the airplane will have the same effect on the signal furnished by the potentiometer winding 158 to the summing bridge, i.e. increase in pitch attitude will add in a positive sense to the lift signal.

However, as the pitch attitude increases, a bucking, i.e., opposing, signal is furnished to the summing bridge from the potentiometer winding 170, so that over a certain range of pitch attitude an increase in pitch attitude does not noticeably, if at all, affect the output from the summing bridge 130, or in other words, for this range the bucking pitch attitude signal approximately (to the extent desired) offsets the additive pitch attitude signal.

When a predetermined threshold pitch attitude is reached or when the acceleration becomes too severe, that is to say, when either the pitch attitude or the acceleration or the combination of both, is such that it is desirable to introduce a limiting effect on the signal furnished, which limiting effect will be proportional to pitch attitude in excess of the threshold pitch attitude, or of an equivalent forward acceleration, the circuit 100 operates to provide an electrical equivalent to the stop 94. Consider, for instance, that the airplane is in non-accelerating flight and it is at a pitch attitude at which the blocking is to commence and beyond which a signal is to be furnished that increases with pitch attitude and which opposes the lift signal. At this time the movable tap 156 has reached a positive potential with respect to the adjustment tap 168 which is at the threshold value of the diode 188, so that the forward resistance of the diode now is negligible. The diode then acts as a shunt across the acceleration-pitch attitude taps 156, 168 so that the lift ratio signal will not be affected by changes therein which make the acceleration-pitch attitude signal more positive. From this point on further movement of the tap 156 on the potentiometer winding 158 toward "nose up" will not change the signal applied across the junctions 142, 146. However, further increase in pitch attitude will increase the signal supplied by the potentiometer winding 170 in a direction which is opposed to increased lift. Therefore, further increases in pitch attitude above the threshold pitch attitude or equivalent forward acceleration will tend to reduce the apparent lift signal appearing across the coil winding 138. This will be an indication to the pilot that the angle of climb is to be lessened. If acceleration is present, there will be a concurrent increase in air speed. It therefore will be appreciated that at and above the threshold pitch attitude the composite action of the potentiometers 158, 170 is to furnish a negative acceleration signal that is proportional to the increase in pitch attitude above threshold pitch attitude. As soon as the pitch attitude or equivalent acceleration falls below a value that causes the diode to have a low forward resistance, e.g. because the available power is lowered, the forward acceleration again exerts an additive effect on the lift signal.

It thus will be seen that I have provided devices which achieve the several objects of my invention and which are well adapted to meet the conditions of practical use.

As various possible embodiments might be made of the above invention, and as various changes might be made in the embodiments above set forth, it is to be understood that all matter herein set forth or shown in the accompanying drawings is to be interpreted as illustrative and not in a limiting sense.

Having thus described my invention I claim as new and desire to secure by Letters Patent:

1. An airplane instrument comprising first means having a variable output responsive to the lift of an airplane, second means having a variable output responsive to the forward acceleration of the airplane, third means having a variable output responsive to the pitch attitude of the airplane and opposing the output of the second means for positive forward acceleration, and means combining said outputs to provide a director signal that increases with increase in available lift and with positive forward acceleration and that decreases with increase in pitch attitude.

2. An airplane instrument comprising first means having a variable output responsive to the lift of an airplane, second means having a variable output responsive to the forward acceleration of the airplane, third means having a variable output responsive to the pitch attitude of the airplane and above a threshold pitch attitude opposing the output of the second means for positive forward acceleration, and means combining said outputs to provide a director signal that increases with increase in available lift and with positive forward acceleration and that decreases with increase in pitch attitude above said threshold.

3. An airplane instrument comprising first means having a variable output responsive to the lift of an airplane, said output increasing with increase in available lift, second means having a variable output responsive to the forward acceleration of the airplane, the output of said second means increasing with increase in positive forward acceleration and decreasing with increase in negative forward acceleration, third means having a variable output responsive to the pitch attitude of the airplane above a threshold pitch attitude, the output of said third means being opposed to the outputs of the first and second means and increasing with increase in pitch attitude, and means combining said outputs to provide a director signal that increases with increase in lift and with positive acceleration and that decreases with increase in pitch attitude.

4. An airplane instrument comprising first means having a variable output responsive to the lift of an airplane, said output increasing with increase in lift, second means having a variable output responsive to the forward acceleration of the airplane, the output of said second means increasing with increase in positive forward acceleration and decreasing with increase in negative forward acceleration, third means having a variable output responsive to the pitch attitude of the airplane above a threshold pitch attitude, the output of said third means being opposed to the outputs of the first and second means and increasing with increase in pitch attitude, and means combining said outputs to provide a director signal that increases with increase in available lift and with positive acceleration and that decreases with increase in pitch attitude above said threshold.

5. An airplane instrument comprising means responsive to the lift of an airplane and having a variable output, a pendulum accelerometer including an aft stop positioned in the path of travel of the pendulum at an angle corresponding to a threshold pitch attitude whereby until the pendulum contacts the stop the position of the pendulum is a funtcion of forward acceleration and after the pendulum contacts the stop the position of the pendulum is a function of the pitch attitude of the airplane, horizontally stabilized means responsive to the position of the pendulum of said last named means and having a variable output, and means combining said outputs in a position to provide a director signal.

6. An airplane instrument as set forth in claim 5 which further includes a utilization mechanism controlled by the director signal.

7. An airplane instrument as set forth in claim 6 wherein the utilization mechanism is a meter.

8. An airplane instrument as set forth in claim 5 wherein the signal controls the elevator of the airplane.

9. An airplane instrument as set forth in claim 5 wherein the lift responsive means and the pendulum responsive means include transducing means to convert lift and pendulum position to variable electric characteristics constituting the variable outputs, and wherein the combining means combines said variable electric outputs.

10. An airplane instrument as set forth in claim 5 wherein the lift responsive means includes a transducer for changing an electric characteristic responsive to change in lift, wherein the pendulum position responsive means includes a potentiometer responsive to the position of the pendulum and thereby providing an electric characteristic responsive to the position of the pendulum, and wherein the combining means combines both said electric characteristics.

11. An airplane instrument comprising first means responsive to the lift of an airplane and having a variable electric output, second means responsive to the forward acceleration of an airplane and having a variable electric output, third means responsive to the pitch attitude of the airplane above a threshold pitch attitude and having a variable electric output, the output of the third means being opposed to the output of the first and second means and increasing with increase in pitch attitude, and means electrically combining said electrical outputs to provide a director signal that increases with increase in available lift and with positive acceleration and that decreases with increase in pitch attitude above said threshold.

12. An airplane instrument comprising first means responsive to the lift of an airplane and having a variable electric output, second means responsive to the forward acceleration of an airplane and having a variable electric output, third means responsive to the pitch attitude of the airplane and having a variable electric output, means to render the third means effective above a threshold pitch attitude, the output of said third means being opposed to the output of said first and second means and increasing with increase in pitch attitude, and means electrically combining said electrical outputs to provide a director signal that increases with increase in available lift and with positive acceleration and that decreases with increase in pitch attitude above said threshold.

13. An airplane instrument comprising first means responsive to the lift of an airplane and having a variable electric output, second means responsive to the forward acceleration of an airplane and having a variable electric output, third means responsive to the pitch attitude of the airplane and having a variable electric output, means to electrically render the third means effective above a threshold pitch attitude, the output of said third means being opposed to the output of said first and second means and increasing with increase in pitch attitude, and means electrically combining said electrical outputs to provide a director signal that increases with increase in available lift and with positive acceleration and that decreases with increase in pitch attitude above said threshold.

14. An instrument as set forth in claim 13 wherein the means to render the third means effective above a threshold pitch attitude includes a diode.

References Cited in the file of this patent
UNITED STATES PATENTS

| | | |
|---|---|---|
| 2,892,180 | Smith | June 23, 1959 |
| 2,945,375 | Greene et al. | July 19, 1960 |
| 2,953,327 | Clement et al. | Sept. 20, 1960 |